United States Patent [19]

Joyner

[11] Patent Number: 5,122,051
[45] Date of Patent: Jun. 16, 1992

[54] MOLDED PART EJECTION APPARATUS

[75] Inventor: Van K. Joyner, West Chester, Ohio

[73] Assignee: Cincinnati Milacron Inc., Cincinnati, Ohio

[21] Appl. No.: 638,980

[22] Filed: Jan. 10, 1991

[51] Int. Cl.⁵ .................. B29C 45/43; B29C 45/44
[52] U.S. Cl. ........................... 425/556; 425/451.6; 425/593; 425/809
[58] Field of Search .............. 425/556, 554, DIG. 58, 425/809, 592, 593, 451.5, 451.6

[56] References Cited

U.S. PATENT DOCUMENTS

| | | | |
|---|---|---|---|
| 3,161,918 | 12/1964 | Zearbaugh | 425/556 |
| 3,597,798 | 8/1971 | McDonald | 425/590 |
| 4,605,367 | 8/1986 | Gutjahr | 425/150 |
| 4,828,769 | 5/1989 | Maus et al. | 264/1.3 |

FOREIGN PATENT DOCUMENTS 696643  9/1940  Fed. Rep. of Germany ... 425/DIG. 58

OTHER PUBLICATIONS

"Arburg Allrounder," brochure published by Maschinenfabrik Hehl & Sohne, Lossburg, Germany, 20 pages, no publication date.
"Arburg Basic-Information," brochure published by Arburg Maschinenfabrik Hehl & Sohne, GmbH & Co. KG, Lossburg, Germany, 17 pages, printed in Jun. 1988.

Primary Examiner—Tim Heitbrink
Attorney, Agent, or Firm—Nies, Kurz, Bergert & Tamburro

[57] ABSTRACT

Part ejection apparatus for ejecting molded parts from a mold carried by a movable platen in an injection molding machine. A plurality of linearly operating hydraulic cylinders are provided to move an ejector bar that is carried along guide rods supported by a movable platen so that the ejector bar moves toward and away from a mold member that is carried by the movable platen. Suitable connections can be provided between the ejector bar and the ejection mechanism of the mold to drive ejector pins carried by the mold for separating the molded part from the mold surface. Additionally, a rotary motor is also carried by the movable platen and has its axis coincident with the longitudinal axis of the movable platen for connection of an output shaft of the motor with a drive mechanism carried by a mold, the drive mechanism suitable for rotating rotatable cores that form internal threads on the molded article. The linear and rotary ejection apparatus can be used individually, or they can be used in appropriate sequence in a core-type mold where separation of the cores does not simultaneously effect separation of the part from the mold.

14 Claims, 6 Drawing Sheets

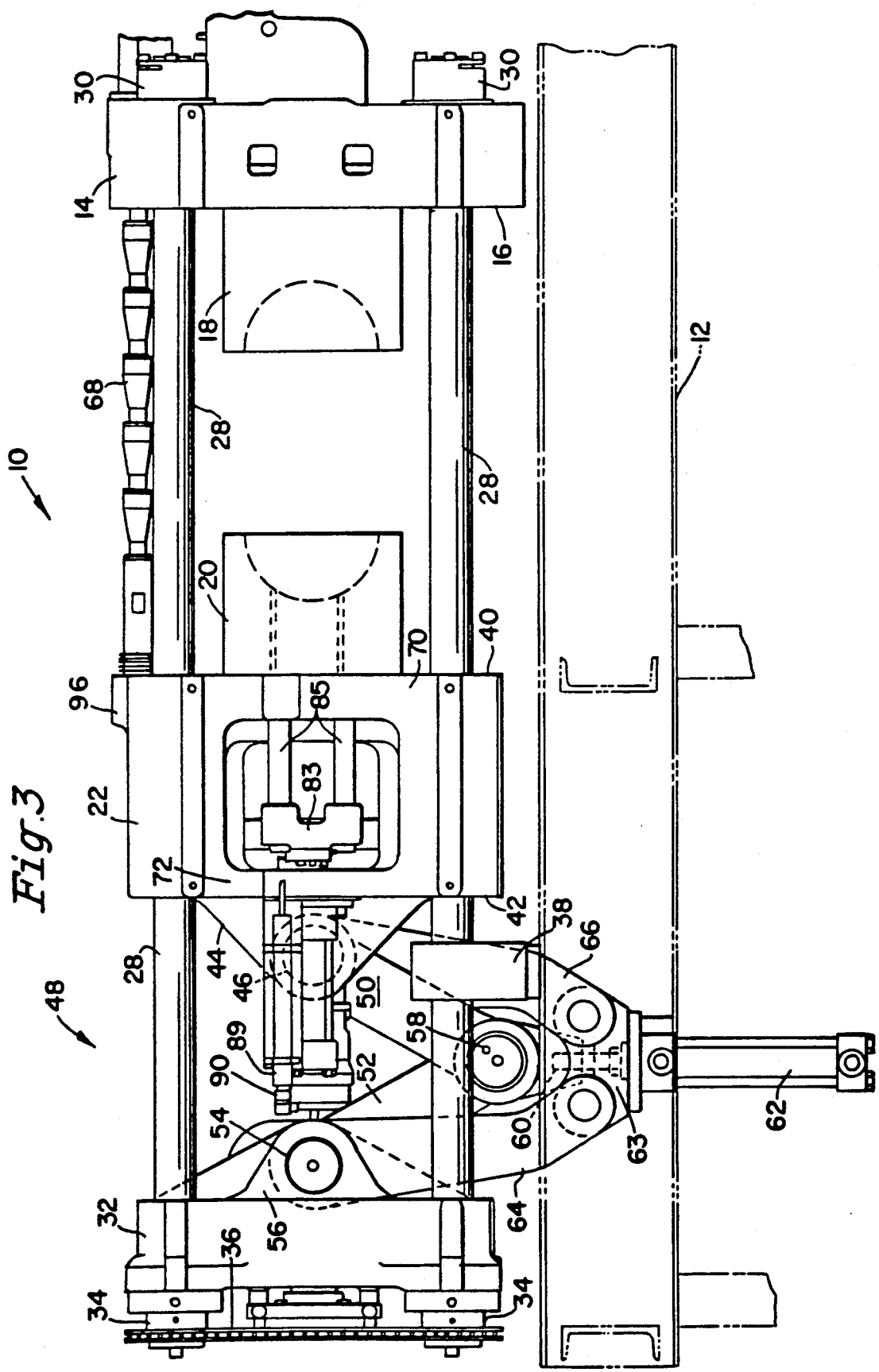

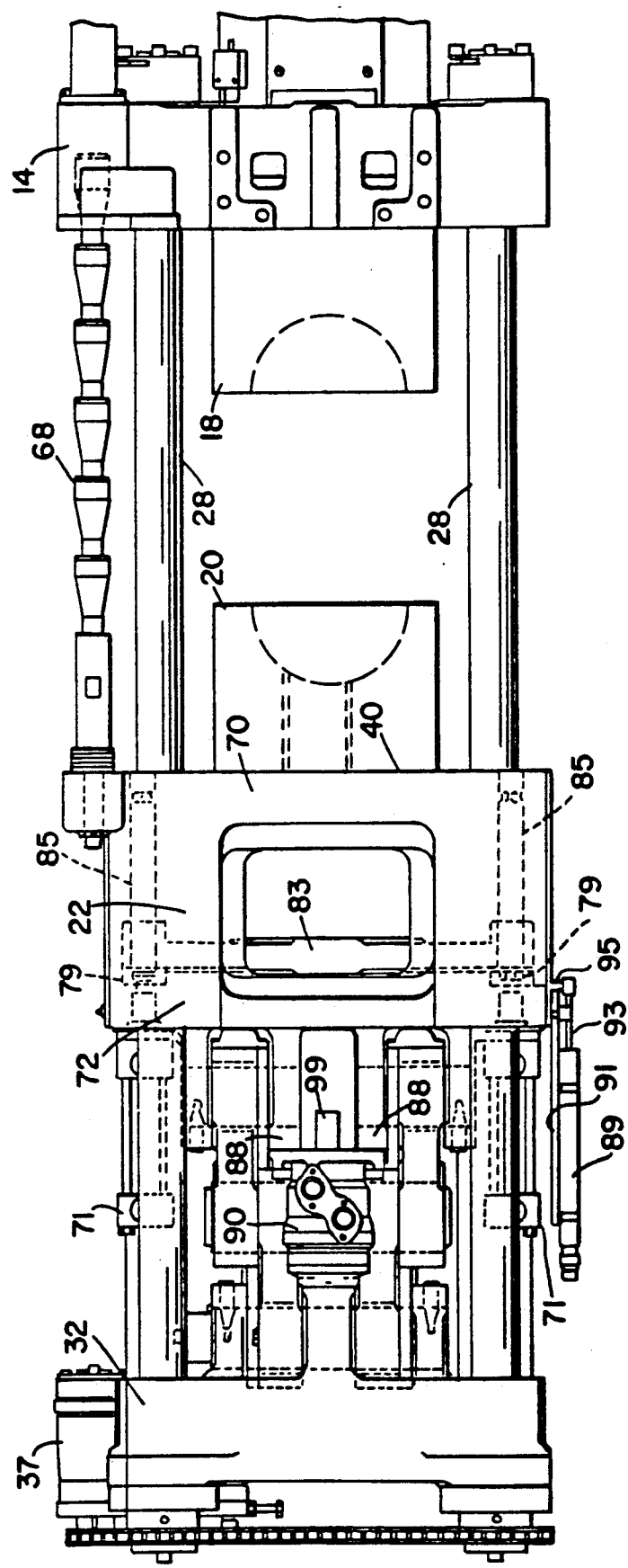

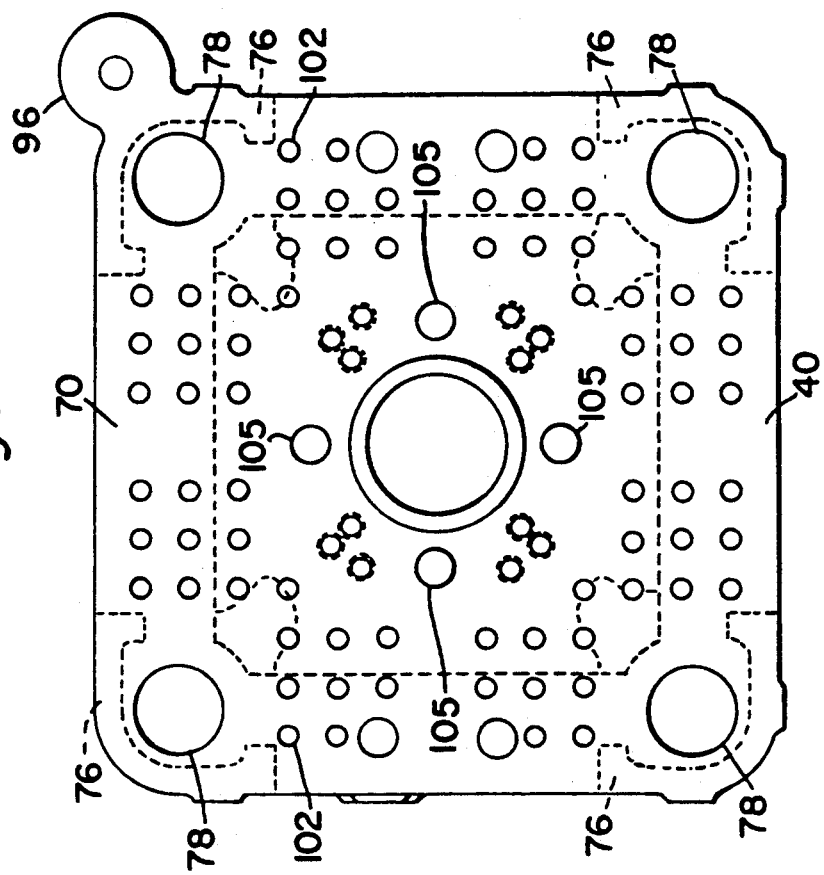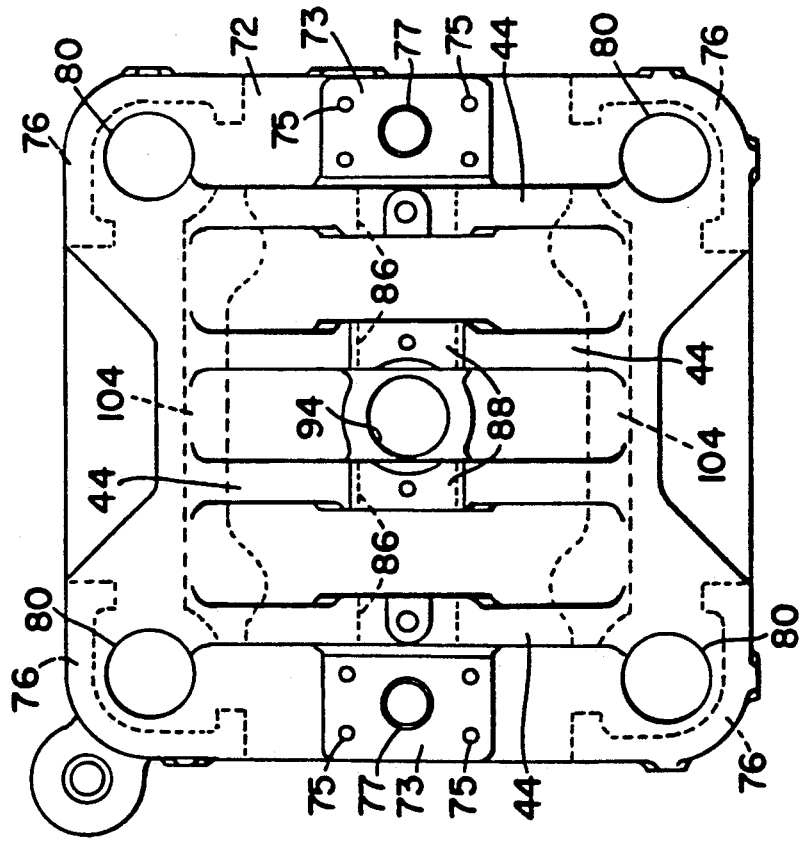

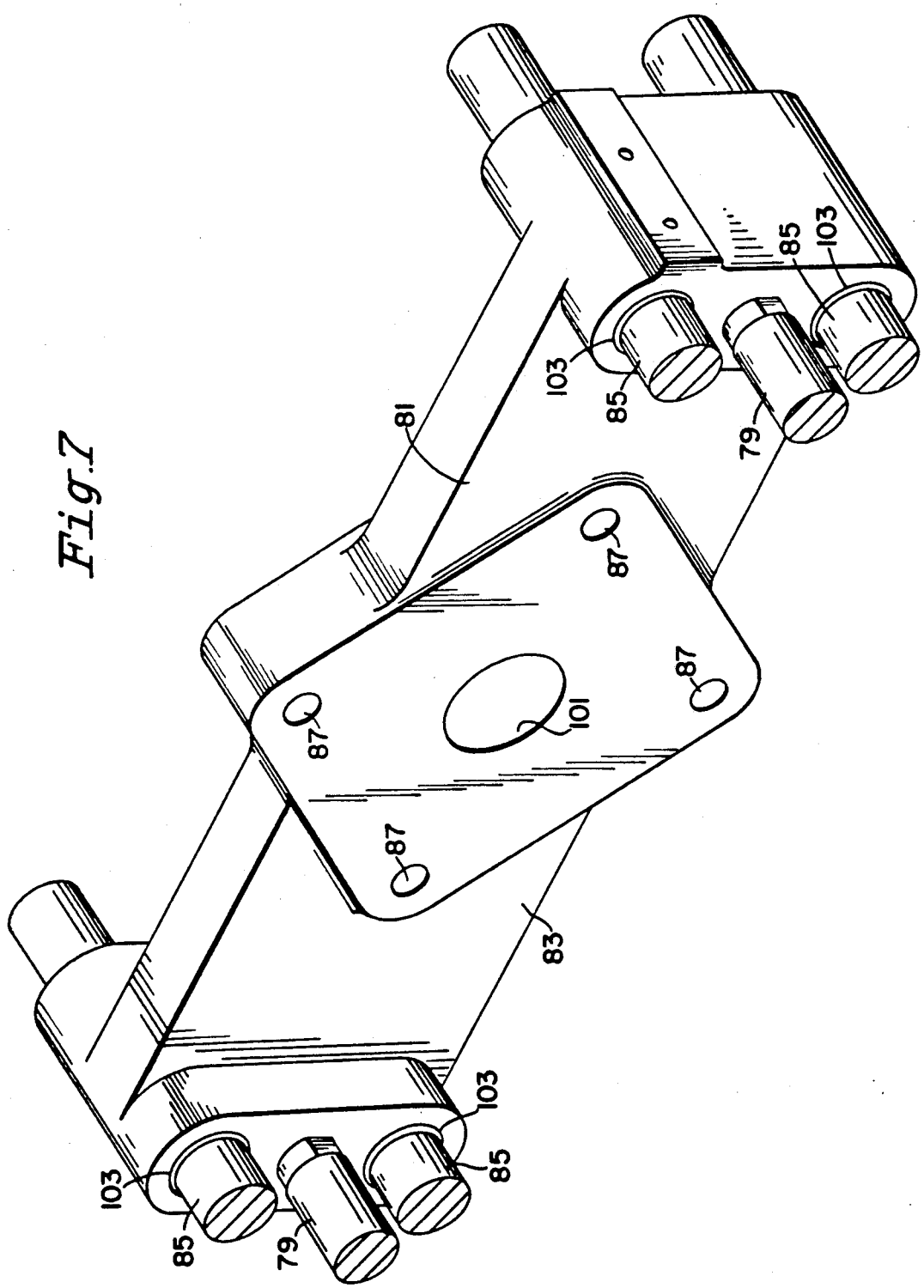

MOLDED PART EJECTION APPARATUS

BACKGROUND OF THE INVENTION

1. Field of the Invention

The present invention relates to apparatus for ejecting molded parts from a mold, and more particularly to a molded part ejection apparatus adapted for use with a mold in an injection molding machine, in which a mold-carrying platen includes a first part ejector for axially ejecting a part, and a second part ejector for rotationally removing a core member from a molded article.

2. Description of the Related Art

In the art of injection molding articles from plastics materials, frequently the molded article will adhere to the surface of the mold, which requires either manual part removal or a power operated removal device for separating the part from the mold surface in order for the next molding cycle to proceed. Oftentimes, ejector pins are provided within one part of a two or greater part mold, the ejector pins extending through the wall of the mold to the inner surface thereof and having inner ends conforming with the adjacent interior surface of the mold. After a molded part has solidified and has cooled to a sufficient temperature that it retains its shape and the molds have been separated, the ejector pins are moved along their axes in the direction of the part to push against the part and provide a separation force for separating the part from the mold surface.

When a molded part has internal threads that are formed by an externally threaded core over which the molded material is caused to flow, removal of the part requires that the cores be unthreaded from the molded article. In that case, a rotary motor is provided to rotate the core in an unscrewing direction to separate and withdraw the core from the threaded bore.

In the past, rotary or linear actuators were separately attached to and detached from a mold or from a mold-carrying platen, depending upon whether the part could be removed by ejector pins or whether it could only be removed by unscrewing. As a result, it was often necessary to remove one type of ejector and to install the other when the type of mold was changed.

It is an object of the present invention to avoid the need to disassemble and remove one type of mold ejector and to separately install the other type.

SUMMARY OF THE INVENTION

Briefly stated, in accordance with one aspect of the present invention, apparatus is provided for separating molded parts from a mold surface. The apparatus includes a movable platen having a longitudinal axis and movable along the longitudinal axis for carrying and transporting a first mold member into and out of cooperative engagement with a second mold member in order to selectively close and open a mold cavity defined by the mold members. A first molded part ejector is carried by the movable platen for imparting linear movement to engage with ejector pins carried in an injection mold for separating a molded part from the mold. The apparatus also includes a second molded part ejector carried by the movable platen, for imparting rotational movement to engage with a rotatable core member carried in an injection mold. Rotation of the core member causes separation of the molded part from the rotatable core member carried in the mold, to permit the molded part to be removed.

BRIEF DESCRIPTION OF THE DRAWINGS

FIG. 3 is a side elevational view similar to that of FIG. 2, but showing the single toggle clamp actuating mechanism at its fully retracted position with the mold portions open.

FIG. 4 is a top plan view of the machine shown in FIG. 3.

FIG. 5 is a rear elevational view of the movable platen.

FIG. 6 is a front elevational view of the movable platen.

FIG. 7 is a fragmentary perspective view showing an ejector bar and portions of ejector bar guide rods.

DESCRIPTION OF THE PREFERRED EMBODIMENTS

Figure 1:
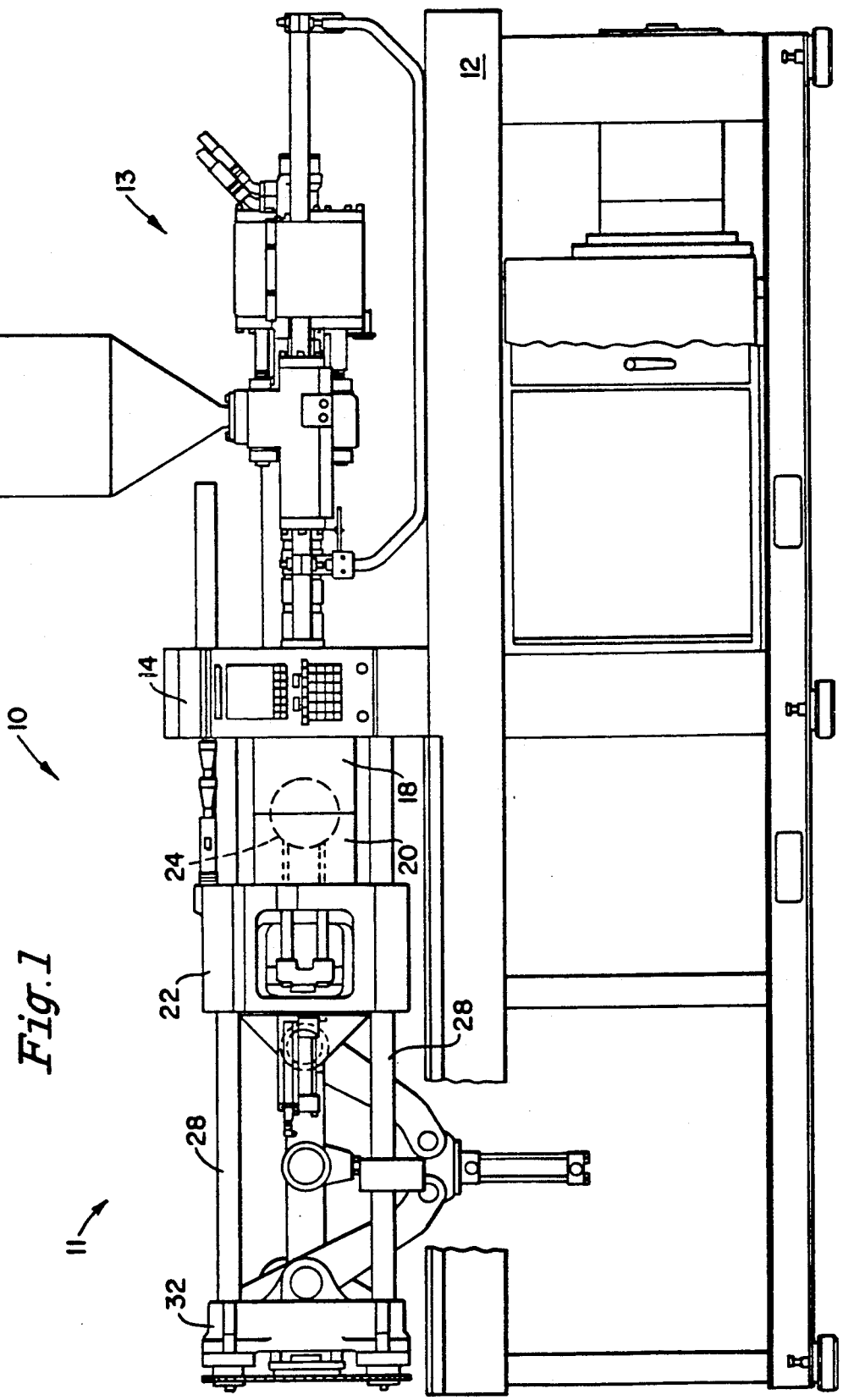
FIG. 1 is a side elevational view of an injection molding machine including a movable platen carrying an ejection apparatus in accordance with the present invention, and showing a single-toggle-type mold actuating and clamping mechanism in its fully extended position with the mold portions in contact with each other.

Referring now to the drawings, and particularly to FIG. 1 thereof, there is shown an injection molding machine 10 that includes a base 12 that supports a plastication and injection system 13 for plasticating a solid polymeric material into a flowable, viscous form and for injecting the plasticated material into a mold cavity 24 defined by a pair of cooperating mold portions 18, 20 that are movable relative to each other to selectively open and close mold cavity 24.

Mold portion 20 is supported for movement toward and away from mold portion 18 by a mold traversing and clamping system 11 that includes a stationary platen 14 connected to base 12 to securely support mold portion 18. Mold portion 20 is secured to a movable platen 22 that is slidably carried on tie rods 28 that extend between stationary platen 14 and a die height platen 32, which is also carried on base 12. Mold traversing and clamping system 11 is a toggle-type system that is provided for traversing mold portion 20 toward and away from mold portion 18, and for securely holding together mold portions 18 and 20 while plasticated material is injected into mold cavity 24 under high pressure.

Figure 2:
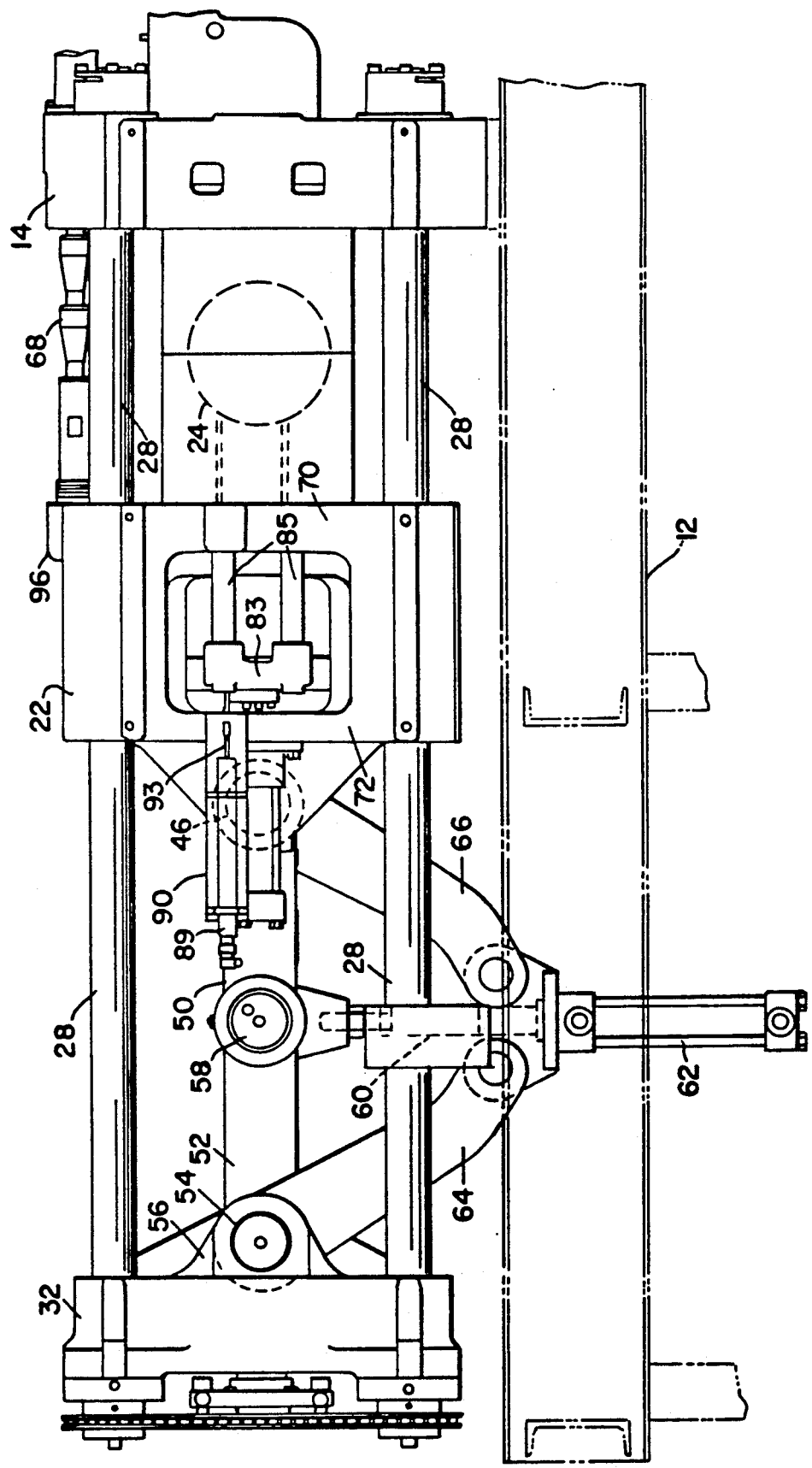
FIG. 2 is an enlarged side view of the mold actuating and clamping mechanism shown in FIG. 1.

Mold traversing and clamping system 11 is shown in enlarged detail in FIGS. 2 and 3. Traversing and clamping section 11 is mounted on machine base 12, which is of generally rectangular form and of a construction that is well known to those skilled in the art. Stationary platen 14, which is a generally rectangular structure, is rigidly secured to base 12 and includes a planar face 16 to which mold portion 18 is securely connected.

Positioned adjacent stationary platen 14 on the side opposite from face 16 is plastication and injection system 13, only a portion of which is shown in FIGS. 2 and 3, which plasticates originally solid plastics particles or powders to provide a molten, flowable mass suitable for injection into mold cavity 24. Injection system 13 includes a tubular barrel that rotatably carries a plasticating screw for plasticating the material, for conveying the plasticated material toward mold cavity 24, and for injecting the material into mold cavity 24 under high pressure. Because plastication and injection system 13 forms no part of the present invention, and because its structure and operation are well known to those skilled in the art, no further description of that unit will be provided herein.

Four parallel, cylindrical tie rods 28 are provided and have their respective longitudinal axes disposed in a generally rectangular array. Tie rods 28 extend from face 16 of stationary platen 14, and an end of each of tie rods 28 is secured in position relative to stationary platen 14, as by means of nuts 30. The opposite ends of tie rods 28 carry a die height platen 32, which is also intended to be stationary during a molding cycle. However, die height platen 32 is shiftable toward and away from stationary platen 14 by means of adjusting nuts 34 that are rotatably carried by die height platen 32 and that can be rotated by a drive chain 36 that passes around and drives respective sprockets operatively connected with nuts 34. Drive chain 36 is driven by motor 37 (see FIG. 4). Adjusting nuts 34 engage with external threads formed on the ends of tie rods 28 and are threadedly carried by the respective tie rods so that rotation of nuts 34 causes die height platen 32 to be moved either toward or away from stationary platen 14 in order to accommodate molds having differing thicknesses. The two lowermost of tie rods 28 are held in position relative to machine base 12, at a point near die height platen 32, by respective tie rod supports 38, only one of which is visible in FIGS. 1 and 2.

Movable platen 22 is slidably carried on tie rods 28 and is positioned between die height platen 32 and stationary platen 14. Movable platen 22 includes a front face 40 that is opposite face 16 of stationary platen 14, and that carries mold portion 20 that is adapted to cooperatively engage with mold portion 18 to define therebetween one or more mold cavities into which the molten material is injected to form the desired parts. Rear face 42 of movable platen 2 carries a plurality of vertically extending, laterally spaced pillow blocks 44 that have aligned bores to rotatably carry a front pivot pin 46, which is a part of a toggle-type platen actuating apparatus 48 for moving movable platen 22 toward an away from stationary platen 14.

Toggle type platen actuating apparatus 48 is in the form of a conventional single toggle arrangement that includes a pair of toggle front links 50 that have one end pivotally carried on front pivot pin 46, and a pair of toggle rear links 52 that have one end pivotally carried on a rear pivot pin 54. Pin 54 is, in turn, carried in aligned bores formed in each of a plurality of laterally spaced, vertically extending die height platen pillow blocks 56. The respective toggle front and rear links are interconnected at their innermost free ends by a center pivot pin 58, that is operatively connected with the piston rod 60 of an hydraulic cylinder 62 that serves as the toggle actuator cylinder. Cylinder 62 is supported from a cross member 63 that is pivotally connected with a pair of toggle cylinder support links 64, 66 that have their opposite ends respectively pivotally carried by rear pivot pin 54 and front pivot pin 46.

In FIGS. 1 and 2, movable platen 22 is shown in its fully extended position, relative to die height platen 32, and toggle actuator piston rod 60 is extended and in its uppermost position to cause the axis of center pivot pin 58 to lie on a line extending between the axes of front and rear pivot pins 46 and 54, so that respective toggle links 50 and 52 are coaxial. When movable platen 22 is in the position shown in FIG. 2, mold portions 18 and 20 are in contact and define therebetween closed mold cavity 24, into which the flowable molten plastic material is injected under high pressure. The aligned toggle links 50 and 52 serve to prevent movable platen 22 from moving away from stationary platen 14 as a result of the force imposed on the mold cavity surfaces by the pressure of the injected material. After the injected material has cooled, toggle piston rod 60 is retracted into toggle actuator cylinder 62, thereby drawing center pivot pin 58 toward cylinder 62 and causing movable platen 22 to move away from stationary platen 14 and toward die height platen 32, to separate the mold portions and permit the molded part to be removed from mold cavity 24.

In the position shown in FIG. 3, movable platen 22 is completely retracted and is in its furthest position relative to stationary platen 14. In that position piston rod 60 is fully retracted into toggle actuator cylinder 62, and toggle front and rear links 50, 52 are angularly positioned as shown.

As best seen in FIGS. 4 and 5, the ejector apparatus is carried by movable platen 22 and includes a pair of linearly acting hydraulic cylinders 71 that are carried on the rear face of movable platen 22. As shown, the actuators are each secured to a mounting pad 73 positioned on opposite sides of the longitudinal centerline of clamping section 10, and they are each positioned equidistantly from that axis. Cylinders 71 as shown are a conventional piston-cylinder arrangement, in which the rod ends of the respective cylinders 71 are bolted to mounting pads 73 on the rear face of movable platen 22. Mounting pads 73 each include threaded blind bores 75 to receive connecting bolts (not shown), and they also include a centrally positioned rod opening 77 to permit respective piston rods 79 to extend through rear plate 72 of movable platen 22.

Piston rods 79 are each connected with the rear face 81 of an ejector bar 83 as shown in FIG. 7. Actuation of cylinders 71 by the introduction of pressurized hydraulic fluid into the cylinders results in axial movement of the respective piston rods 79 that causes axial movement of ejector bar 83 along the axes of ejector bar guide rods 85 that are secured to and carried by movable platen 22.

FIG. 7 shows the rear face 81 of ejector bar 83. The forward face can carry drive pins (not shown) that are carried in ejector pin mounting bores 87 provided in ejector bar 83. The drive pins can be positioned for cooperative engagement with a particular configuration of ejection apparatus that is used with a particular injection mold, as will be appreciated by those skilled in the art.

As best seen in FIGS. 3 and 4, movable platen 22 also carries a position sensor, such as linear potentiometer 89, for sensing linear movement of ejector bar 83 relative to movable platen 22. As shown, linear potentiometer 89 is carried by a mounting plate 91 that is, in turn, bolted to one side of movable platen 22. Potentiometer 89 includes a rod 93 that is attached to a connecting plate 95 that is, in turn, connected with ejector bar 83, so that as ejector bar 83 moves along guide rods 85 it carries with it connecting plate 95 and rod 93. As a result, the output of potentiometer 89 can be used to provide a signal indicative of the position of ejector bar 83 relative to movable platen 22, and it also can be used to control an interlock device to prevent movement of movable platen 22 when ejector bar 83 is in its forwardmost position relative to front face 40 of movable platen 22.

Movable platen 22 also carries a rotary motor 90, such as an hydraulic motor, for imparting rotation about an axis of rotation that is coincident with the longitudinal axis o clamp section 10. Motor 90 is mounted on mounting pads in the form of flat surfaces that are machined on the rearmost ends of the two center pivot pin pillow blocks 8 that extend rearwardly from rear face 42 of movable platen 22. Motor 90 includes an output drive shaft 99 that is connectable with a suitable drive shaft (not shown), for driving a core rotating mechanism (not shown). In that regard, rear plate 72 of movable platen 22 includes a centrally positioned ejector motor shaft opening 94 (see FIG. 5) and front plate 70 includes a coaxially positioned ejector motor shaft opening 92 (see FIG. 6). Additionally, ejector bar 83 also includes a centrally positioned opening 101 to permit passage therethrough of a drive shaft so that a direct connection can be effected between motor 90 and a core rotation mechanism that is provided in an injection mold, as will be appreciated by those skilled in this art.

As shown in FIG. 7, ejector bar 83 is a substantially rectangular, plate-like structure, and includes four rectangularly arrayed bores 103 for slidably receiving respective ejector bar guide rods 85. Four rectangularly arrayed ejector pin mounting bores 87 are also provided which, as earlier explained, can receive ejector actuator pins (not shown) that are connectable with a linearly movable ejector device carried by an injection mold. The ejector actuator pins are adapted to pass through drive pin bores 105 that are provided in front plate 70 of movable platen 22 and that are aligned with respective ejector pin mounting bores 87 in ejector bar 83. Also shown in FIG. 7 is a fragmentary view of piston rods 79.

In operation, after molten plastic material has been injected into the mold cavity and the material has been permitted to cool sufficiently, the molds are separated from each other in order to permit removal of the molded part. Mold portion 20 that is carried by movable platen 22 normally contains some type of ejection apparatus for effecting removal of the molded part from the mold surface. Most usually, the ejection arrangement is one or more ejector pins that are adapted to be movable against the part to push it away from and to forcibly separate it from the mold surface. In that regard, ejector bar 83 slidably carried by movable platen 22, by suitable connection with the mold (not shown), permits the actuation of hydraulic cylinders 71 to cause ejector bar 83 to move toward mold portion 20 and thereby cause the ejector pins within the mold to move in a direction to push the molded part from the mold surface. After the part is separated and removed from the mold, piston rods 79 are retracted into the respective cylinders 71 to cause ejector bar 83 to move away from mold portion 20, and to retract the ejection apparatus to its non-operative position, whereupon the molding cycle is repeated.

If the particular mold that is being employed to mold parts includes one or more rotatable core members for forming internally threaded bores in the molded part, instead of using linear hydraulic cylinders 71 for part ejection, hydraulic ejection motor 90 is employed and is actuated to drive a core unscrewing mechanism through a suitable drive arrangement (not shown) to cause the respective cores to be unscrewed from the part. If necessary, after the unscrewing operation, and if the part remains adhered to the surface of the mold, linear hydraulic cylinders 71 can be actuated in order to move ejector bar 83 toward the mold to thereby cause the respective ejector pins to separate the molded article from the mold.

It can thus be seen that the present invention provides distinct advantages over the prior art approaches and that it provides both rotational and linear actuation apparatus for separating a molded part from the mold surface. In addition to the separate linear and rotational ejection forces that can be utilized, they can both be used together with a single mold, in appropriate sequence, to effect separation of the molded part from the mold surface.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. Apparatus for selectively providing linear or rotary motive force for actuating a respective first or second molded part separation means carried by a first mold member to enable separation of a molded part from a surface of the first mold member, said apparatus comprising:
    a) a movable platen having a longitudinal axis and movable along the longitudinal axis for carrying and transporting said first mold member into and out of cooperative engagement with a second mold member to selectively close and open a mold cavity defined by the mold members;
    b) first independently operable molded part ejector means carried by the movable platen for imparting linear movement relative to the movable platen for linearly actuating the first molded part separation means carried in said first mold member for separating the molded part from said mold surface of said first mold member; and
    c) second independently operable molded part ejector means carried by the movable platen for imparting rotational movement relative to the movable platen for rotationally actuating the second molded part separation means carried in said first mold member for separating the molded part from the mold surface of said first mold member.

2. Apparatus as claimed in claim 1, wherein the first molded part ejector means includes a linear actuator and at least one ejector rod connected with the linear actuator and operatively engagable with the first molded part separation means, the ejector rod positioned for axial movement within an aperture in the movable platen.

3. Apparatus as claimed in claim 2, including a pair of linear actuators positioned on opposite sides of the longitudinal axis of the movable platen.

4. Apparatus as claimed in claim 3, wherein the linear actuators have their axes positioned in a horizontal plane.

5. Apparatus as claimed in claim 1 wherein said first mold member includes part ejector pins slidably carried in the first mold member to extend inwardly to a mold inner surface, and the first molded part ejector means is operatively connected with the ejector pins to slidably move the pins relative to the mold inner surface.

6. Apparatus as claimed in claim 1, including an ejector bar slidably carried by the movable platen on guide pins positioned inwardly of and adjacent to the lateral edges of the movable platen.

7. Apparatus as claimed i claim 6, wherein the ejector bar is slidably supported on guide rods carried by the movable platen.

8. Apparatus as claimed in claim 1 wherein the second molded part ejector means includes a motor carried by the movable platen for providing torque about an axis extending in a longitudinal direction of the movable platen.

9. Apparatus as claimed in claim 8 wherein the motor is centrally positioned on a rear face of the movable platen, said rear face being located opposite from a face on which the first mold member is carried.

10. Apparatus as claimed in claim 8 wherein the motor is an hydraulic motor.

11. Apparatus as claimed in claim 9 wherein the motor is carried on pillow blocks positioned on the rear face of the movable platen for rotatably supporting a pivot pin connected with one end of a toggle link.

12. Apparatus as claimed in claim 8 wherein the motor has an output drive shaft that extends along the platen longitudinal axis and passes through the platen.

13. Apparatus for separating molded parts from a mold surface, said apparatus comprising:
a) a movable platen having a longitudinal axis and movable along the longitudinal axis for carrying and transporting a first mold member into and out of cooperative engagement with a second mold member to selectively close and open a mold cavity defined by the mold members;
b) first molded part ejector means carried by the movable platen for providing a linear mold part separating force, wherein the first molded part ejector means includes a linear actuator and at least one ejector rod positioned for axial movement within an aperture in the movable platen; and
c) second molded part ejector means carried by the movable platen for providing a rotational mold part separating force, wherein the second molded part ejector means includes a motor carried by the movable platen for providing torque about an axis extending in a longitudinal direction of the injection molding machine.

14. Apparatus for separating molded parts from a mold surface, said apparatus comprising:
a) a movable platen having a longitudinal axis and movable along the longitudinal axis for carrying and transporting a first mold member into and out of cooperative engagement with a second mold member to selectively close and open a mold cavity defined by the mold members;
b) first molded part ejector means carried by the movable platen for providing a linear mold part separating force, wherein the first molded part ejector means includes a linear actuator and at least one ejector rod positioned for axial movement with an aperture and the movable platen; and
c) second molded part ejector means carried by the movable platen for providing a rotational mold part separating force, wherein the second molded part ejector means includes a motor carried by the movable platen for providing torque about an axis extending in a longitudinal direction of the injection molding machine and the motor is carried on pillow blocks positioned on a rear face of the movable platen for rotatably supporting a pivot pin connected with one end of a toggle link, and wherein the motor has an output drive shaft that extends along the platen longitudinal axis and passes through the platen.

* * * * *